United States Patent [19]

Massmann

[11] 4,399,465

[45] Aug. 16, 1983

[54] SYSTEM FOR SCANNING OF MOTION PICTURE FILMS TO DERIVE TELEVISION SIGNALS

[75] Inventor: Volker Massmann, Mühltal, Fed. Rep. of Germany

[73] Assignee: Robert Bosch GmbH, Stuttgart, Fed. Rep. of Germany

[21] Appl. No.: 311,673

[22] Filed: Oct. 15, 1981

[30] Foreign Application Priority Data

Oct. 17, 1980 [DE] Fed. Rep. of Germany ....... 3039211

[51] Int. Cl.³ .............................................. H04N 5/36
[52] U.S. Cl. ....................................... 358/214; 358/54
[58] Field of Search .................. 358/54, 214, 215, 216

[56] References Cited

U.S. PATENT DOCUMENTS 4,205,337  5/1980  Millward ............................ 358/214
4,310,856  1/1982  Poetsch ............................. 358/214
4,346,408  8/1982  Massmann ......................... 358/214

Primary Examiner—Michael A. Masinick
Attorney, Agent, or Firm—Frishauf, Holtz, Goodman & Woodward

[57] ABSTRACT

To prevent cutting lines and overlap of frames upon reproduction of standard motion-picture film, in which the motion-picture film is scanned and the scanned signals are recorded in a store (16), the store is divided into storage blocks, each capable of storing 36 lines, addressing of the respective storage blocks such that two times seven or two times five storage blocks are utilized for storing of the frames, the sequence of the blocks with respect to the scanned lines changing from film frame to film frame, with the sequence repeating every four frames.

10 Claims, 3 Drawing Figures

SYSTEM FOR SCANNING OF MOTION PICTURE FILMS TO DERIVE TELEVISION SIGNALS

Reference to related applications and patents, assigned to the assignee of the present application:

U.S. Ser. 151,781, filed May 21, 1980, POETSCH, now U.S. Pat. No. 4,310,856, Jan. 12, 1982

U.S. Ser. 154,284, filed May 29, 1980, by the inventor hereof, now U.S. Pat. No. 4,346,408, Aug. 24, 1982.

The present invention relates to a system for scanning motion picture films, exposed in accordance with motion picture film format, in order to obtain television signals for transmission or storage in accordance with television standards.

BACKGROUND

The present system is a further development and an improvement on the television system described, in general, in the prior application assigned to the assignee of the present invention, U.S. Ser. No. 151,781, filed May 21, 1980, now U.S. Pat. No. 4,310,856, POETSCH. It has been found that, upon scanning films, both in normal format as well as of the Cinemascope type, in accordance with the United States NTSC standard of 525 lines/30 frames with interlace, the television (TV) image may show horizontal cutting edges upon reproduction and with normal customary addressing of storage elements used in the film scanning apparatus. These cutting edges interfere with undisturbed viewing of the TV image since they subdivide the TV image in regions containing information from different film frames. It has already been proposed to sequentially scan films which are run off at normal speed, for example 24 frames per second, to obtain a 525 lines/60 Hz format; the frames are scanned, alternatingly, twice and three times, and are reproduced as fields, corresponding to half-frames, by line interlace reproduction (see my earlier application U.S. Ser. No. 154,284, filed May 29, 1980, now U.S. Pat. No. 4,346,408).

THE INVENTION

It is an object to improve the film scanning system described in U.S. application Ser. No. 151,781, POETSCH, now U.S. Pat. No. 4,310,856, by eliminating any possibility of the formation of cut edges, and to so arrange the scanning system that overlap or cut edges appearing in the middle of a frame or field will be avoided.

Briefly, storage elements are provided to store television signals representative of fields, in which the storage elements are subdivided into respectively sixteen storage blocks, each capable of storing 36 lines. Each one of the film frames is stored in two times seven storage blocks, the sequence of which changes from film frame to film frame with respect to four sequential film frames, so that the change in sequence repeats for each four frames, that is, for a film speed of 24 frames per second, at the rate of 6 Hz.

Cinemascope or normal-format films are scanned to derive TV-type signals in accordance with the 525 line/60 Hz standard. The storage blocks which each store a field are, alternatingly, read-out once, and once and twice, respectively.

DRAWINGS

Figure 1:
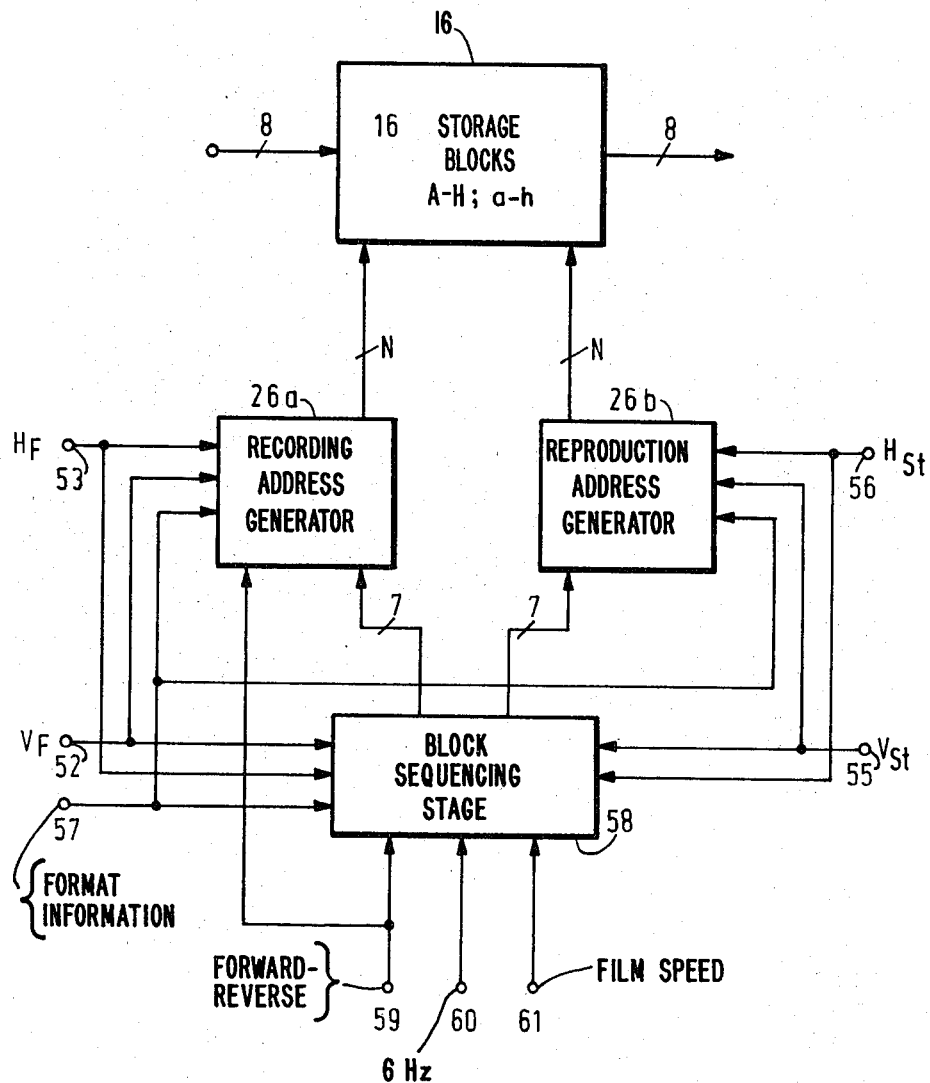
FIG. 1 is a fragmentary block diagram showing the TV signal frame storage system in accordance with the present invention.

FIG. 1 is a fragmentary view of the storage system only of the overall film scanning system of the aforementioned application Ser. No. 151,781, POETSCH, now U.S. Pat. No. 4,310,856, and all that portion of the system which is not material for an understanding of the present invention has been omitted. For ease of association of the drawing of FIG. 1 of the present application with the system of the aforementioned POETSCH application Ser. No. 151,781, now U.S. Pat. No. 4,310,856, the same reference numerals have been used as in the POETSCH application, or patent, respectively, to the extent possible. The present invention is specifically directed to the recording or reading-in and reproducing or reading-out of the field store 16, and to the generation of the respective recording and reproducing addresses.

Video signals, derived from scanning of a film frame and transformed into digital signals, are applied to the store or memory 16. Upon reproduction or read-out, the signals are reconverted by a digital-to-analog converter into analog TV signals.

In accordance with a feature of the invention, the store 16 includes sixteen storage blocks A to H (FIGS. 2a, 2b) for the first field, and a–h for the second field. The storage blocks are addressed by a recording address generator 26a, for example in the form of a counter; upon reproduction, the address is generated by a reproduction or read-out address generator 26b. Read-out will be in accordance with the 525 line/60 Hz standard. Address control of the sixteen storage blocks is effected by digital signals of N=19 bits.

The recording address generator has vertical pulses $V_F$ applied thereto at terminal 52, derived from the sprocket wheel of the film over which it is being guided. The reproducing address generator 26b has vertical frequency synchronization signals and horizontal frequency synchronization signals derived from studio synchronization generators applied, the vertical studio frequencies $V_{St}$ being applied to terminal 55, and the horizontal synchronization studio frequency signals $H_{St}$ being applied to terminal 56. Additionally, the address generators 26a, 26b receive format information over a terminal 57. The recording address generator has horizontal film pulses applied at terminal 53, derived from a drive capstan over which the film is guided.

In accordance with a feature of the invention, and to reliably prevent overlap and cut lines upon recording and reproducing of the scanned signals, a block sequence generator 58 is provided which controls the address generators 26a and 26b with 7-bit words, respectively. The block sequence generator 58 receives input signals derived from the vertical film pulses, terminal 52, the horizontal film pulses, terminal 53, and the format information. The block sequence generator, also, receives the vertical and horizontal studio synchronization signals $V_{St}$ and $H_{St}$ from terminals 55, 56. Additionally, the block sequence generator 58 receives information whether the film is running forward or backward, from terminal 59, input frequency at the rate of 6 Hz, to provide for repetition of sequences of read-out of the groups of the storage blocks at terminal 60, and pulses representative of film speed at terminal 61.

Figure 2A:
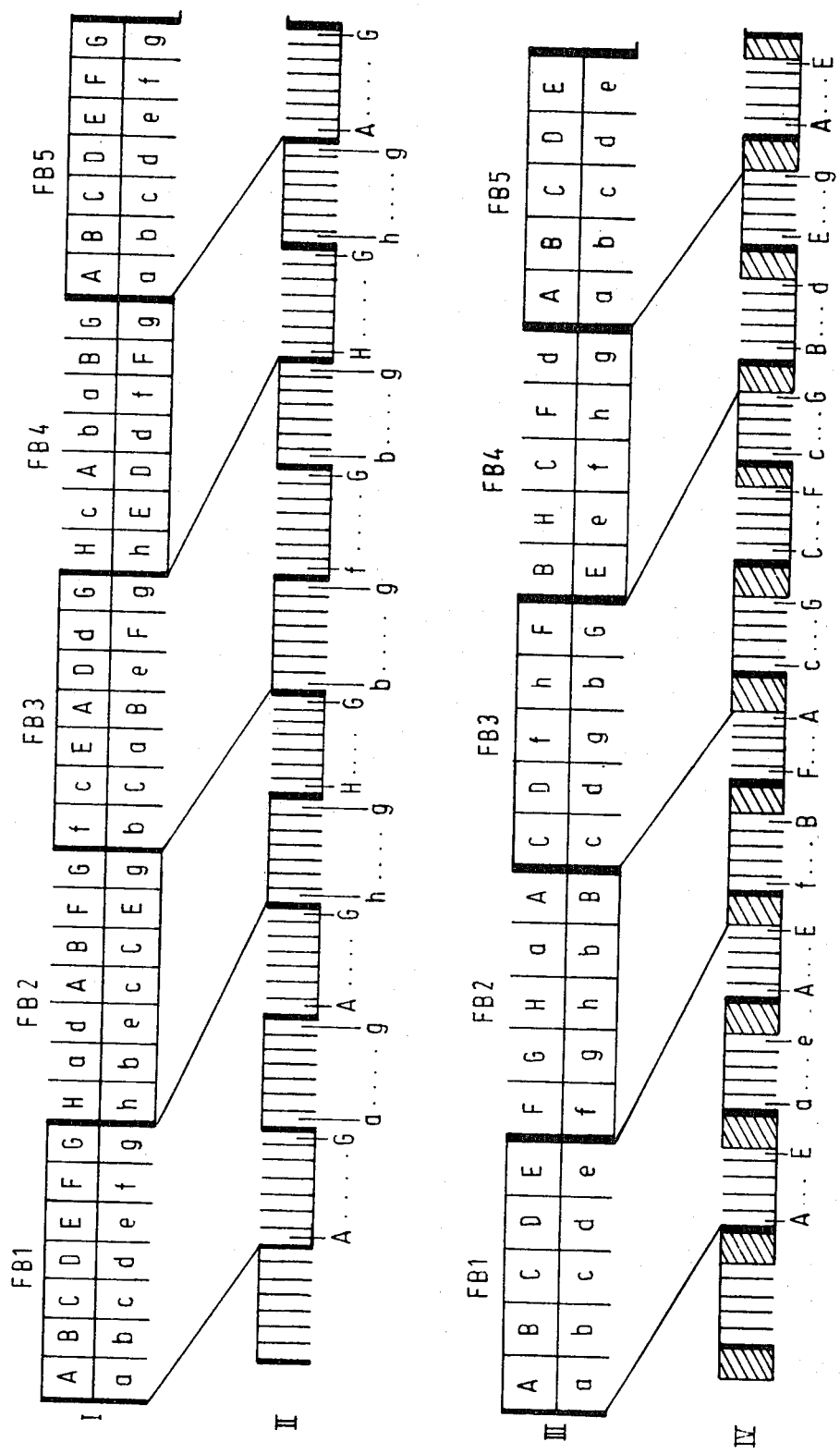
FIG. 2a is a storage-time diagram for reading-in and reading-out of the film frames for a forward-moving film at 24 frames/second.

Operation with reference to FIG. 2a: FIG. 2a illustrates recording and reproduction of scanned film signals with read-out or output scanning in accordance with the 525 lines/60 Hz standard.

Line I of FIG. 2a illustrates the recording process of five sequential film frames, FB1 to FB 5, of a normal-format film into the storage blocks A to H and a to h. Line II illustrates the reproducing or read-out sequence from the storage blocks of the store 16.

The first film frame FB1 is entered into the storage blocks A to G and a to g in alternate-line recording. Thirty-six of the odd lines of the scanned film frame are read into the block A to G; thirty-six of the even scanned lines are read into the block a to g. Thus, block A will record the lines 1, 3, 5 . . . 71; block a will record the lines 2, 4, 6 . . . 72; block B will record the lines 73, 75, 77 . . . 107; block b the lines 74, 76, 78 . . . 108.

Reproduction or read-out, as seen in line II of FIG. 2a, is carried out by the line interlace system in accordance with the 525 line/60 Hz standard. First, all blocks A to G of the odd lines of the field are read; thereafter, all the blocks a to g of the even lines of the field are read; thereafter, the blocks A to G of the odd lines are read once more. The start of the reproduction or read-out cycle is so selected that the end of the read-out or reproduction cycle, that is, reproduction from the last storage block, does not occur before the reproducing cycle into the last storage blocks has terminated.

The second frame of the film FB2 is entered into the storage blocks in an entirely different sequence. This different sequence is generated by the block sequence generator 58 at the next occurring 60 Hz pulse (i.e. the second pulse). This is necessary since the reproduction or read-out cycle of the first film frame FB1 will still persist. The recording sequence of storage blocks for the second film frame FB2 will be, for the odd lines, H, a, d, A, B, F, G and, for the even lines, h, b, e, c, C, E. g. Read-out or reproduction of the signals which are stored in this manner, as seen in line II of FIG. 2a, of course will be in the same block sequence. First the even field is reproduced or read-out, namely, h, b, e, c, C, E, g, and thereafter the odd field, H, a, d, A, B, F, G.

Upon normal film speed, thus, and in accordance with the 525 line/60 Hz standard, alternatingly three and two half-frames are read-out, corresponding to, alternatingly, three and two TV fields.

The third and fourth frames FB3 and FB4 are read in the respective storage blocks again in changed sequence and are correspondingly reproduced. The sequences are illustrated in FIG. 2a. The four film frame cycle will repeat, so that the fifth film film FB5 is entered in storage block A to G and a to g, similar to film frame 1, and is similarly read out. The sixth film frame will be recorded and reproduced as film frame 2, etc. Thus, the storage block sequence will repeat all four frames; with a film speed of twenty-four frames per second, a control signal of 6 Hz, applied to the block sequence generator 58, can thus address the respective sequencing stored in the block sequence generator for controlling of the sequences of the respective film frames.

The block sequence generator, for example, may contain read-only memories (ROMs) which, upon being addressed by the 6 Hz signal from terminal 60, controls the sequence of addressing of the recording address generator 26a and the reproduction address generator 26b for proper sequencing of the sixteen storage blocks of the store 16.

As can be seen, the first and third film frames result in reading-out of the sixteen storage blocks in such a manner that an addressed group of eight blocks is read-out twice; the differently addressed storage blocks, which store the frame information from the second and fourth film frames FB2, FB4, are read out only once. Each film frame, FB1, FB2, etc., requires only fourteen of the sixteen storage blocks. By reading-out the storage blocks such that the odd lines of the first frame FB1 are read-out twice, will result in alternation of reproduction between odd and even lines in subsequent frames, that is, the odd lines of film frame FB1 are read-out first; the even lines of film frame FB2, and the even lines of film frame FB3 are read-out first, and then the odd lines of film frame FB4, as well as the first frame of the next cycle, FB5.

Lines III and IV, of FIG. 2a, respectively, illustrate recording and reproduction of five sequential film frames FB1 to FB5 of a Cinemascope film in the storage blocks A to H and a to h of the store 16.

As can be clearly seen, each film frame is recorded in two times five storage blocks, for example for frame FB1 in blocks A to e and a to e. This is due to the decreased number of lines of Cinemascope film. Consequently, it is desirable to change the sequence of the storage blocks with respect to those used for normal-format film. The sequence of storage blocks will repeat after each fourth film frame. The greater distances between the fields, upon reproduction in accordance with line IV of FIG. 2a, is due to the lesser number of lines in the Cinemascope film reproduction. A dark strip will appear in the reproduced film at the upper and lower edge of the television picture. The sequences, again, are shown in lines III, IV of FIG. 2a.

Figure 2B:
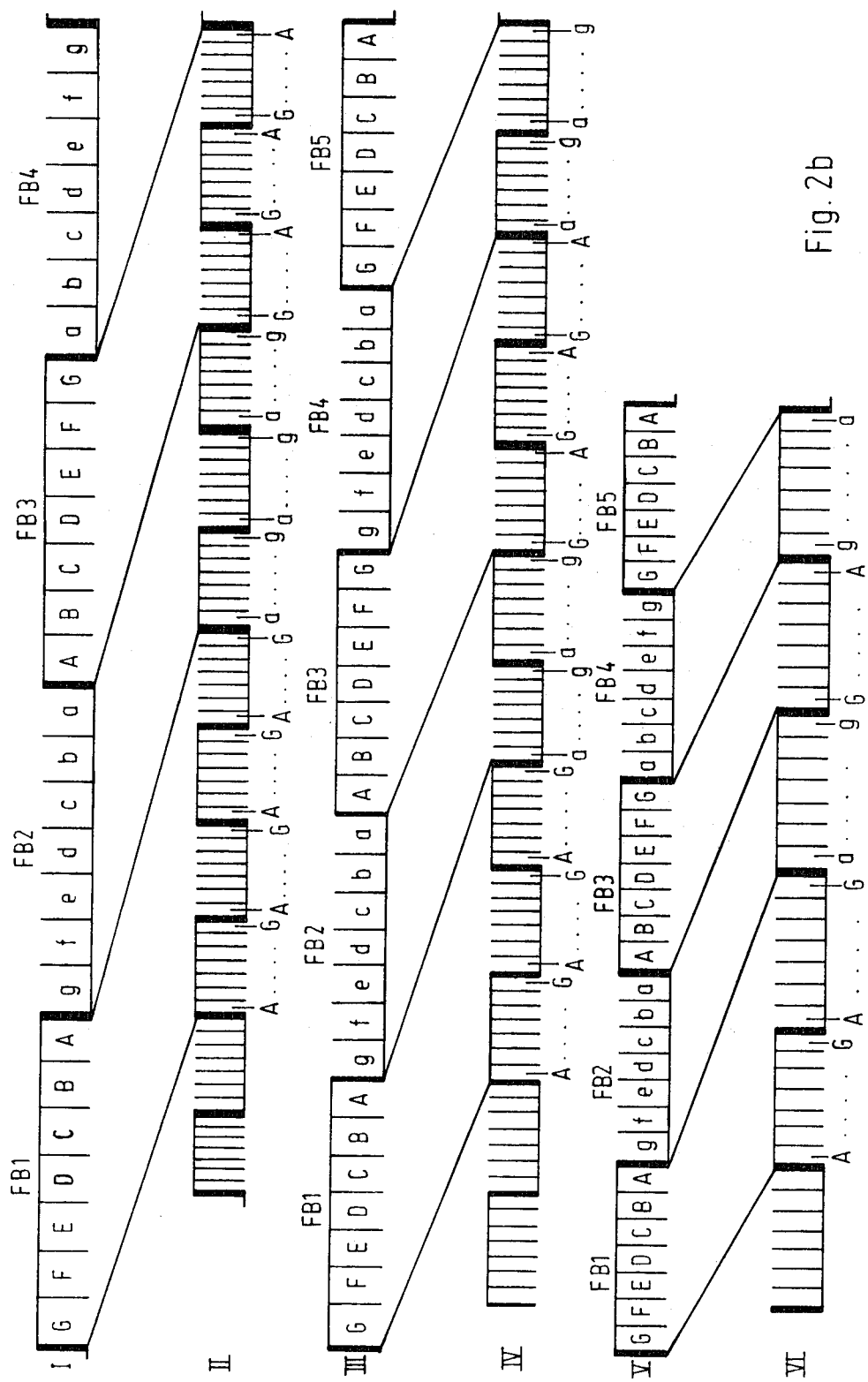
FIG. 2b is a diagram similar to FIG. 2a illustrating similar relationships for a reversely running film at the speed of 18 frames per second.

The film speed need not be 24 frames per second, but may be different; FIG. 2b illustrates recording and reproduction, in lines I, II, of a normal-format type film with 18 frames per second, in reverse running.

The film frames FB1 to FB4 are sequentially recorded in each seven blocks. The sequence of the blocks, in accordance with the reverse running, is from G to A or, respectively, from g to a. The read-out or reproduction step of the first film frame FB1 has not yet terminated when the third film frame FB3 is to be recorded. Consequently, the third frame cannot be entered into the store in the sequence G to A but, rather, is entered into the store in reverse sequence, A to G since, otherwise, overlap upon recording and reproduction might occur. A similar situation pertains with respect to the fourth film frame FB4. The film frame is read-out or reproduced from the corresponding storage blocks completely, repetitively, until the next film frame is recorded in the next subsequent storage blocks, again in order to prevent edge lines and cut lines from appearing in the reproduced TV picture.

Each one of the film frames is stored only as fields, corresponding to half a frame; the missing interlace, that is, the missing field, can be generated in accordance with TV standard by interpolation of two adjacent field lines, as described in detail in the aforementioned POETSCH application Ser. No. 151,781, now U.S. Pat. No. 4,310,856.

Line III of FIG. 2b illustrates recording of five sequential film frames FB1 to FB5 of a film with normal format, and operating in reverse direction at a speed of 24 frames per second. Line IV illustrates the read-out or reproduction cycle from the storage blocks of store 16. Recording and reproduction is carried out similarly as described in connection with lines I and II of FIG. 2b. Line V and line VI of FIG. 2b illustrates recording and reproduction of nine sequential film frames FB1 to FB9 of a film of normal format at a speed of 48 per second, in reverse operation. Recording and reproduction will be carried out as described in connection with lines I, II of FIG. 2b.

When determining the sequence of the blocks, the following limiting conditions must be observed:

(a) In order to be able to utilize the same storage or memory capacity in a 525 line/60 Hz standard with 24 frames per second as with a standard of 625 line/50 Hz, 25 frames per second, and further to hold the necessary requirements for memory addressing as low as possible, a 625 line/50 Hz standard memory was subdivided into 16 blocks, in which 14 blocks are sufficient in film format with a lateral relationship of 1:1.33 (standard film format) or ten blocks with a film format with a lateral relationship of 1:1.85 or 1:2.21 (Cinemascope Film format) in order to store a film frame in the 525/60 Hz standard. Thus, two or six blocks, respectively, are available as buffer memory.

(b) In order to hold the sequence of film frames with different block sequences as short as possible, the same block sequencing is used after each four frames (lower counter and addressing requirements).

(c) With the condition (b), the block sequence of each fourth frame is determined. The blocks of the three intermediate frames are then so interchanged, and the buffer memory (H,h for standard film or, respectively, F, G, H, f, g, h for Cinemascope film) is so utilized, that only that film frame is recorded over film frame information which need not be read-out any more.

What is claimed is:

1. System for scanning of film to derive standard television signals in which the film is scanned line-by-line without interlace, having
    a storage means (16) for storing signals connected to receive scanned signals derived from scanning of the film, line by line,
    recording address generating means (26a) for generating specified addresses for control of the storage means, and connected to the storage means, the scanned signals being stored in the storage means at specified addresses under control of the recording address generating means;
    reproduction address generating means (26b) for generating specified addresses for additional control of the storage means, and connected to the storage means, the stored signals being read-out from specified addresses under control of the reproductive address generating means in accordance with television (TV) transmission standards, including line and frame frequency;
    and wherein, upon scanning film of normal or Cinemascope format, and to derive signals for a 525 line/60 Hz interlace television standard, the storage means (16) comprises
    sixteen storage blocks (A–H; a–h) divided into two groups of eight blocks each, each block being capable of storing thirty-six lines of scanned signals corresponding to thirty-six lines;
    the recording address generating means controlling storage of the scanned signals in a predetermined sequence of an odd number of blocks of the two groups, and wherein the sequence, with respect to sequentially scanned sets of thirty-six lines, changes with succeeding film frames, the sequence repeating in cycles of four succeeding frames;
    and wherein the reproduction address generating means controls read-out of the stored signals for, alternatingly, reading-out the storage blocks of one group first, then the storage blocks of the other group, and, with respect to every other film frame, the storage blocks of the first group are read-out once more after read-out of the second block, whereby the first and third frames will have the first group of storage blocks read-out twice, and the second group of storage blocks read-out once between the double read-out of the first storage blocks.

2. System according to claim 1, wherein the storage blocks of the two groups include, each, seven blocks.

3. System according to claim 1, wherein the storage blocks of the two groups include, each, five blocks.

4. System according to claim 1, wherein, for coupled operation, and, upon reverse running of the film at a film speed of less than fifty frames per second,
    one film frame is recorded in the storage blocks of one group of the store (16) in a first predetermined sequence,
    and the preceding film frame is simultaneously and entirely read-out from a respective group of storage blocks so often until the set first film frame is completely recorded in its respective group of blocks,
    and read-out of said groups of blocks storing said one film frame is initiated only after complete recording of said one frame in said respective group of blocks storing the preceding frame are read-out completely, at least once,
    and wherein the recording address control means changes the sequence of addressing of the respective blocks in the groups upon recording of sequential frames to prevent overlap or cutting lines upon reproduction of the TV signals.

5. System according to claim 4, wherein missing interlace lines of missing fields are generated in accordance with TV transmission standards by interpolation of adjacent lines of a field.

6. Method of scanning a motion-picture film to derive standard television signals in which the film is scanned line-by-line without interlace, to derive scanned signals utilizing
    a storage means (16) for storing signals derived from scanning of the film, recording address generating means (26a) and generating specified addresses for control of the storage means connected to the storage means, the scanned signals being stored in the storage means at specified addresses under control of the recording address generating means, and reproduction address generating means (26b) and generating specified addresses for additional control of the storage means and connected to the storage means, the stored signals being read-out from specified addresses under control of the reproduction address generating means in accordance with television transmission standards, including line and frame frequency,
    and wherein, upon scanning film of normal format or Cinemascope format, to derive signals for a 525 line/60 Hz interlace television standard, the method comprises the steps of dividing the storage means into two groups (A–H; a–h), each having an odd number of storage blocks;

storing the scanned signals of a frame in the blocks of the two groups, in which the storage sequence of the blocks, with respect to sequentially scanned sets of thirty-six lines changes with succeeding film frames, the sequence repeating in cycles of four film frames;

reading-out, under control of the reproduction address generating means, said stored signals, alternatingly, by first reading-out the storage blocks of one group, then the storage blocks of the other group, and, with respect to every other frame, the storage blocks of the first group once more after read-out of the storage blocks of the second group, whereby the first and third frames have the first group of storage blocks read-out twice, with the second group of storage blocks read-out once between the double read-out of the first storage blocks.

7. Method according to claim 6, wherein the two groups of storage blocks each includes seven blocks.

8. Method according to claim 6, wherein the two groups of storage blocks each includes five blocks.

9. Method according to claim 6, wherein for coupled operation and reverse running of film, with a film speed of less than 50 frames per second further including the steps of recording one film frame in the storage blocks of one group of the store (16) in a first predetermined sequence;

simultaneously and entirely reading-out a preceding film frame from another respective group of storage blocks, so often until said one film frame is completely recorded in its group of blocks;

initiating read-out of said groups of blocks storing said one film frame only after complete recording of a frame in said group of blocks and only when read-out, at least once, of the groups of blocks storing a preceding frame has been entirely completed;

and changing the sequence of addressing of the respective blocks in the groups upon recording of sequential frames.

10. Method according to claim 9, including the step of interpolating, in accordance with television transmission standards, from adjacent lines of a field missing lines or a missing field.

* * * * *